United States Patent [19]

Schuman

[11] Patent Number: 4,780,197

[45] Date of Patent: Oct. 25, 1988

[54] CHLORINATION MODULE FOR CARTRIDGE FILTER UNIT

[75] Inventor: Michael L. Schuman, Walnut, Calif.

[73] Assignee: Rainbow Lifegard Products, Inc., El Monte, Calif.

[21] Appl. No.: 860,659

[22] Filed: May 7, 1986

[51] Int. Cl.$^4$ .............................................. C02F 1/50
[52] U.S. Cl. ................................. 210/136; 210/206; 210/209
[58] Field of Search .............. 210/136, 169, 256, 261, 210/206, 416.2, 493.5, 205, 209; 422/264, 282

[56] References Cited

U.S. PATENT DOCUMENTS

| | | | |
|---|---|---|---|
| 3,677,711 | 7/1972 | Bond | 23/267 A |
| 3,899,425 | 8/1975 | Lewis | 210/169 |
| 4,210,624 | 7/1980 | Price | 422/264 |
| 4,217,331 | 8/1980 | Schaub | 422/265 |

OTHER PUBLICATIONS

Product Brochure: "Rainbow Lifegard Dynamic Series Spa/Pool in Line Cartridge Filter", Rainbow Lifegard Products, Inc., DBA Rainbow Plastics, 1985.

Primary Examiner—Ivars Cintins
Attorney, Agent, or Firm—Christie, Parker & Hale

[57] ABSTRACT

A filter and chemical dispenser combination for filtering and chemically treating water to be added to a body of water includes a liquid inlet, a liquid outlet, and a flow passage between the inlet and the outlet. A filter element is positioned in the flow passage between the inlet and the outlet extending in a longitudinal direction and having a hollow interior. Means are provided in the interior of the filter element and in the flow passage for supporting a chemical. In a further embodiment of the invention, a chemical dispenser is provided for chemically treating a body of water wherein the dispenser includes an inlet for pressurized liquid and an outlet for liquid from the inlet. A flow passage is between the inlet and the outlet. A chemical chamber is provided in the flow passage between the inlet and the outlet for forming a compressible gas pocket. The chamber includes a base for supporting the chemical. The pocket-forming means has a first aperture for allowing liquid from the inlet into the pocket-forming chamber, and a second aperture for passing liquid out of the chamber.

27 Claims, 5 Drawing Sheets

CHLORINATION MODULE FOR CARTRIDGE FILTER UNIT

BACKGROUND OF THE INVENTION

1. Field of the Invention

The present invention relates to a chemical dispenser for a body of water, and more specifically to a chlorinator for a cartridge-type pool or spa filter and also to a chemical dispenser utilizing an air load principle for regulating the concentration of chemical dispensed to the pool or spa.

2. Related Art

Cartridge-type pool filters are well known in the art. The filter includes a canister or tank for containing a hollow cylindrical filter element. The housing has a fluid inlet and a fluid outlet in the bottom and the cylindrical filter element fits around a perforated standpipe extending upward from the bottom of the tank. Water flows into the tank and up the sides of the container along the outside of the filter element. Because the incoming water is pressurized a pressure gradient exists across the filter element, and the water is forced substantially radially through the circumferential portion of the cylindrical filter element to the interior of the filter element. The outlet pressure is lower than the inlet pressure so that the filtered water passes from the interior of the filter element through the perforated standpipe and to the outlet.

A variant of the filter described above has the inlet and outlet connections to the filter located at the upper end of the filter housing. If desired, all or only a portion of the water supplied to the housing inlet is routed to the filter chamber for flow through the filter element. Usually such flow diversion is determined by a pressure responsive mechanism which, in cases where the filter is used in a spa having a two-spaced water circulating pump, reacts to high pump pressure to shunt a major portion of the inlet water flow direct to the outlet from the filter. Such a filter is the Dynamic Series Model RDC-25 spa/pool in-line cartridge filter manufactured by the Rainbow Plastics Filter Division of the assignee of this invention.

Regardless of the specific nature of the cartridge filter structure, it is coupled to the high pressure or discharge side of a spa or pool circulation pump which, most often, operates on a daily cycle under control by a timer.

Chemicals for swimming pool use come in a variety of forms. Chlorine is commonly used in swimming pools and is available in granules, tablets and concentrated liquid. Some of the chemicals may be introduced by hand or by elaborate automatic mechanical devices. Additionally, the chemicals may be introduced using float packages similar to those shown in U.S. Pat. Nos. 3,677,711 and 4,217,331.

Particularly in spa systems, it is desirable that the filter and chlorinator structure be as compact as possible. Heretofore, so far as is known, chlorinators have either been provided as units separate from filters but used with the filters, or as add-on assemblies mountable to the top of the filter so as to increase the height of the filter. A need exists for a chlorinator arrangement which can be located wholly within the envelope otherwise provided for the filter. This invention addresses that need and has particular utility in the context of filters used with spas.

SUMMARY OF THE INVENTION

A filter and chemical dispenser combination for filtering and chemically treating water to be added to a body of water includes a liquid inlet and a liquid outlet. A flow passage extends between the liquid inlet and the liquid outlet. A filter element is positioned in the flow passage between the inlet and the outlet, extends in a longitudinal direction and has a hollow interior. Means are provided in the interior of the filter and in the flow passage for supporting a chemical soluble in the liquid to be passed through the flow passage. This arrangement provides for a compact and efficient way for chemically treating a body of water, such as chlorination of a pool or spa. The standard cartridge-type filter arrangement can be modified to directly chlorinate the water passing through the filration system. Additionally, valve control means may be provided for regulating the amount of chemical dispensed as a function of the system used. This may be done by controlling the liquid flow in a secondary flow path which feeds the chemical dispenser.

The filter and dispenser assembly may accommodate several different types of chemical treatment, such as use of high solubility chlorine tablets or low solubility bromine sticks.

In a further embodiment of the invention, a chemical dispenser includes an inlet for pressurized liquid, an outlet for liquid from the inlet, and a flow passage between the inlet and the outlet. Means is provided in the flow passage for forming a compressible gas pocket. The pocket forming means includes a base for supporting the chemical used to treat the water. The pocket forming means includes a first aperture for allowing liquid from the inlet into the pocket-forming means, and a second aperture for passing the liquid out of the pocket-forming means.

In this embodiment, the chemical is placed on the base of the pocket-forming means to be contacted by water passing from the first aperture to the second aperture. The pressurized water entering the first aperture compresses the gas pocket formed in the pocket-forming means so that the chemical is exposed to the water coming through the first aperture. Only a limited portion of the chemical is exposed to the incoming water. The remainder of the chemical is protected and surrounded by the gas pocket or air load still present in the pocket-forming means. This arrangement is particularly useful where the filtration system is used intermittently. When the pump of the filtration system is turned off, the pressure of the water at the first aperture decreases so that the water is expressed or forced away from the chemical by the air pocket. This minimizes the dissolution of the chemical during times when there is no water flow through the filtration system. When the filtration system is subsequently started up, the pressure developed by the pump compresses the air pocket to again expose chemical for dissolution.

In a further embodiment of the invention, the cartridge-type filter is applied for use on a spa. For example, the inlet and the outlet may be placed at the top of the cartridge filter assembly so that water passes from the inlet down into the cartridge assembly, through the filter material of the hollow cylindrical filter element and then back up to the top of the assembly to the outlet. This arrangement may also be fitted with a chemical dispenser in the form of the chemical dispenser as described above.

BRIEF DESCRIPTION OF THE DRAWINGS

In the drawings:

FIG. 2A is a side section of a portion of the chemical dispenser of FIG. 2;

DETAILED DESCRIPTION OF THE PREFERRED EMBODIMENTS

Figure 1:
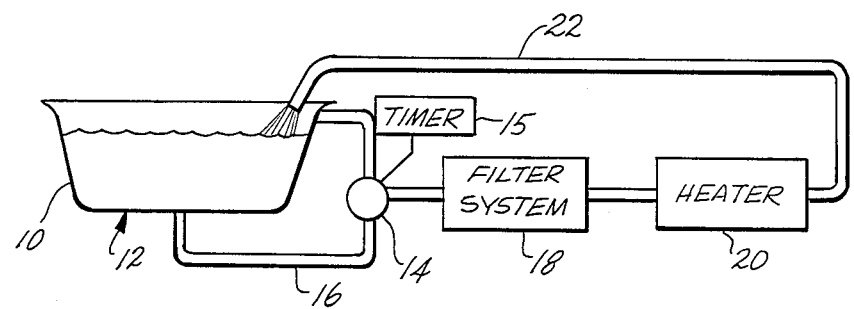
FIG. 1 is a schematic and block diagram of a filtration system and heating system for a typical pool.

A typical water circulation and filtration system for a body of water is shown in FIG. 1. A body of water 10 is contained in a pool or spa 12. The filtration system includes a pump 14 for taking water from the drain of the pool through pipe 16 and pumping the water to a filter system 18. The water being passed to the filter system is therefore pressurized. The water is filtered in the filter system, passed to a heater 20 and thereafter allowed to return to the pool through a return line 22. The pool water may be further treated by adding chemicals either by hand or through a float system. The pump normally operates on a daily ON-OFF cycle determined by an adjustable timer 15.

Figure 2:
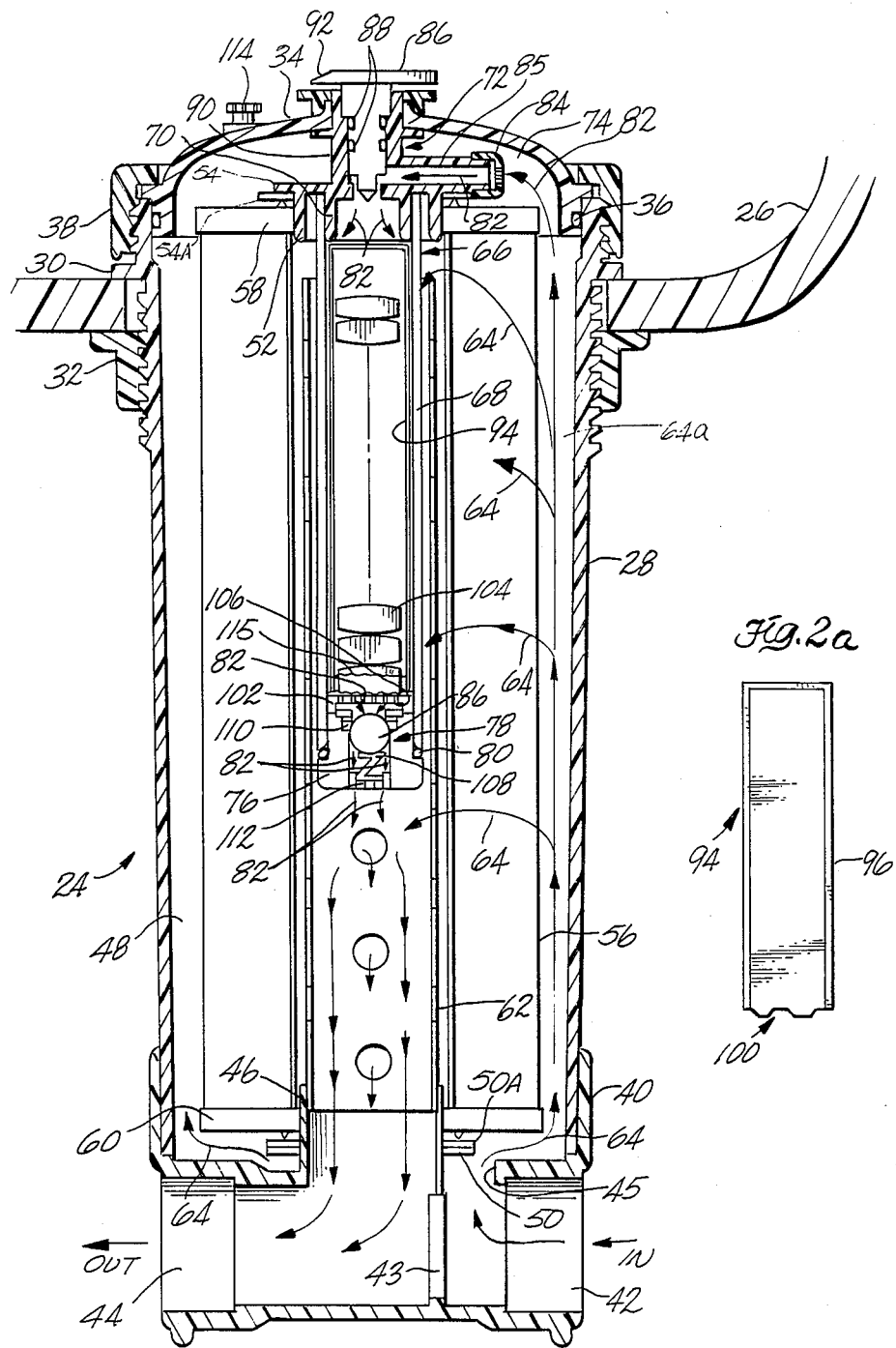
FIG. 2 is a side section of a cartridge-type filter and chemical dispenser according to the present invention.

FIG. 2 shows a cartridge-type filter and chemical dispenser assembly 24 adapted for use with a spa. It incorporates the cartridge-type filter assembly commonly used in pools but further includes a chemical dispenser. The filter part of the assembly will be described first and then the chemical dispenser. The same filter and chemical dispenser assembly can also be used with pool systems.

The filter/dispenser assembly is mounted to a molded spa deck 26 in a well formed in the deck; the well can be closed by a removable cover, not shown. Assembly 24 includes a generally cylindrical filter tank 28 or housing mounted to and extending below the spa deck. The tank includes a circular flange 30 extending about an upper portion of the tank for resting the tank on the top surface of the spa deck around a filter mounting opening formed in the deck at the bottom of the well. The tank is fixed to the deck through the tank lock ring 32. The assembly includes a cap 34, generally circular in plan view. including an O-ring 36 to form a water-tight seal between outside a circumferential surface of the cap and the inside surface of the top portion of the tank. The cap is fastened over the top opening of the tank through a cap-lock ring 38. The lock ring is accessible from the top of assembly 24 in the well.

The tank is closed at the bottom by a base 40 in which an inlet 42 and an outlet 44 are formed. The base includes a circularly cylindrical sleeve 46 extending upwardly into the interior chamber 48 of the filter tank. The sleeve preferably extends from a center portion of the base. The tube includes a filter support flange 50 extending about an outer circumference of the tube and a gasket 50a.

Inlet 42 and outlet 44 preferably are coaxially aligned and are separated by a septum in which is formed an opening 43. The opening can be blocked by a plug (not shown) as where assembly 24 is adapted for use with a swimming pool, or it can receive a pressure responsive bypass assembly (not shown) as where assembly 24 is used with a spa equipped with a two-speed pump 14; in the latter situation, the bypass assembly is closed when the pump operates at low speed, thereby to cause all inlet water to flow to the filter cartridge through an opening 45 from the inlet to the filter chamber, but when the pump operates at high speed, the bypass assembly opens to shunt a selected portion of the inlet water flow to outlet 44. In any event, all or some of the inlet water is routed to the filter chamber during operation of the circulating pump.

Opposite the cylindrical tube 46 and depending from the center of cap 34 is an upper ciruclar cylindrical sleeve 52. The upper tube also includes a filter-top support flange 54 extending circumferentially about the outside surface of the upper tube and a gasket 54a. A hollow, cylindrical, pleated media filter element 56 includes a top end 58 fitting about the outside surface of the upper sleeve 52, and against the gasket 54a. The filter also includes a bottom end 60 extending around the outside surface of the lower sleeve 46 and against the lower gasket 50a. The pleated filter element extends between the top and bottom ends.

A perforated or apertured standpipe 62 extends from the interior of the lower sleeve 46 upward a substantial distance toward the upper sleeve 52 for collecting the filtered water in the hollow central space of the filter cartridge and for passing the filtered water to the outlet 44.

The filter element defines and is part of a primary flow path indicated by the arrows labeled 64. The primary flow path passes pressurized liquid from the inlet 42 around that portion of the base defining the outlet 44 and upward past the bottom end of the filter element. The water passes along the outside of the filter element in the outer flow plenum 64a and through the pleated filter element as is well known in the art. Water passes through the filter element at all points along the axial length of the filter material in the filter element. Coincident with passing of the fluid through the filter material is a pressure drop across the filter element. The filtered water, or filtrate, then passes through the apertures in the standpipe, and over the top of the standpipe, to the interior of the standpipe to pass downwardly to the outwardly 44. The filtered water then passes from the outlet to the heater or to the spa or pool.

Though a cartridge-type filter assembly described up to this point is in common use in swimming pools, the cartridge-type filter assembly such as that described above can replace the filtration system for spas. The cartridge filter assembly can be used instead of a skimmer-type filter assembly where the filter is in the well of the skimmer and is connected to pump suction for operation at low pressure. The cartridge asembly, shown in FIG. 2 used in conjunction with a spa, can provide a relatively high-presure filtration system operating at approximately twice the efficiency of a skimmer-type filter assembly.

In the embodiment of the invention shown in FIG. 2, the filter and dispenser assembly also includes a chemical dispenser assembly including a chlorinator body 66 having a hollow cylindrical chlorinator tube or sleeve 68 bonded at a top of the sleeve to a depending, cap-coaxial sleeve 70 to form a water-tight seal. The depending sleeve 70 is part of a flow regulator valve assembly 72 mounted in the cap 34. The regulator valve assembly is suspended from the cap into an upper plenum 74 above the filter element 56. The upper cylindrical sleeve 52 described above is concentric with the depending sleeve 70 and the filter top support flange 54 and gasket 54a is supported by the regulator valve assembly 72 about the upper sleeve 52.

The chlorinator sleeve 68 extends downwardly into the interior of the filter element 56. The chlorinator body sleeve is closed at its bottom end through an end cap 76 forming a check valve assembly 78. The check valve assembly is preferably threaded into the lower open end of the chlorinator body sleeve, and forms a watertight and airtight seal through an O-ring 80 between the end cap and the body sleeve. The check valve assembly operates to limit fluid flow from the interior of the chlorinator sleeve 78 into the perforated standpipe 62 and prevents fluid flow from the standpipe into the chlorinator body.

The regulator valve assembly 72, the chlorinator body sleeve 68, the check valve assembly 78 and the elements interior to the chlorinator sleeve 68, described more fully below, comprise a secondary water treatment system additional to the water filtration system. The secondary treatment system defines a secondary flow path identified by the reference numerals 82.

The regulator valve assembly includes a water treatment prescreen 84 in the plenum 74 for coarse-filtering the pressurized water coming in from the inlet 42. The prescreen is removable from the regulator valve assembly for cleaning or replacement. The prescreen covers a regulator inlet tube 85 extending from the prescreen to the main portion of the regulator valve assembly. The regulator valve assembly further includes a threaded chemical regulator needle valve 86 for controlling the flow of pressurized water to the chlorinator body 66. The regulator valve includes a pair of O-rings 88 to provide a watertight and airtight seal. The needle valve is movable through the threaded engagement in and out of a valve housing 90 mounted to the cap 34. The housing may include numerals or other indicia (not shown) to correspond with an indicator 92 for giving an indication of the relative position of the needle valve in the valve housing. The needle valve is movable in the housing to limit or close off the fluid flow from the regulator inlet to the chlorinator body.

The water passing through the regulator valve flows down inside the depending sleeve 70 and the chlorinator body sleeve 68 and over a serrated tablet sleeve 94, shown in more detail FIG. 2A. The tablet sleeve is closed at the top thereof, and is therefore airtight at the top, and is in the form of an inverted tube having cylindrical sides 96 and an open bottom 98. The open bottom includes a rim having ridges or serrations 100 forming at least one wall defining an opening for allowing liquid from the inlet to pass into the interior of the serrated tablet sleeve 94.

The serrated edge rests on a removable outlet screen 102 for keeping particulate matter out of the check valve assembly. The screen also serves as means for supporting a chemical in the form of high solubility tablets 104. The tablets may be formed from chlorine, bromine, or any other suitable halogen ion-forming material; the term "chlorine" is used genericly herein, as well as in the pool and spa industry, to refer to and to mean any suitable halogen ion, and "chlorination" will be understood to mean the process by which a suitable halogen ion is added to water. The chlorine source may be, for example, tri-chloro tablets. The tablets may be stacked as high as the chlorinator sleeve and depending sleeve 70 will allow. The junction of the serrations 100 and the rim of the outlet screen form apertures for allowing liquid from the inlet to pass into the interior of the serrated tablet sleeve 104. The outlet screen 102 comprises a plurality of apertures for allowing liquid to pass out of the interior of the tablet sleeve 94. Each aperture is defined by a respective wall which may be a cylindrical wall forming a round aperture or a rectangular wall formed by a lattice structure forming the removable outlet screen.

The check valve assembly 78 includes a ball 106 forming a one-way valve and including a valve bias load in the form of a spring 108 biasing the ball toward a reduced diameter sleeve 110 for preventing fluid flow from the standpipe into the interior of the chlorinator sleeve. However, when the pressure inside the chlorinator sleeve is greater than the relatively low combined effect of the spring and the pressure in the standpipe, fluid is allowed to flow from the interior of the chlorinator sleeve into the standpipe. The fluid flows past the ball and spring and through a plurality of openings 112 formed in the end cap 76.

The cap 34 preferably includes a vent plug 114, and the base 40 also includes a vent or drain valve (not shown) for venting the interior of the cartridge assembly and for draining the fluid from the interior of the assembly.

For purposes of description of the operation of the apparatus, it will be assumed that the combined filter assembly and chemical dispenser assembly is mounted to a spa deck as shown in FIG. 2. When the chemical tablets are to be added or replaced in the tablet sleeve 94, the filtration system is shut down and the filter tank is drained. The cap 34 is removed by loosening and removing the cap lock ring 38. The cap is then lifted from the filter tank 28, bringing along with it the chemical dispenser assembly. When the cap and chemical dispenser have been removed, the end cap 76 is removed from the chlorinator body sleeve 68. The outlet screen may be removed and cleaned and the interior of the check valve assembly 78 may also be cleaned or replaced. The chlorinator sleeve and the tablet sleeve may also be inspected as necessary. The pretreatment screen 84 may be removed and cleaned and the regulator valve assembly inspected. Additional tablets are then placed in the interior of the tablet sleeve 94 forming the chlorine source chamber. This may be done by inverting the cap and tablet sleeve and dropping the individual tablets into the interior of the tablet sleeve. The check valve assembly may then be replaced over the end of the chlorinator sleeve and tightened down. If necessary, the filter cartridge may be removed, cleaned, and replaced. The cap and chemical dispenser are inverted and replaced over the top of the tank and fastened thereto with the cap lock ring 38. At this point, the open spaces in the interior of the tank are substantially filled with air. The tablet sleeve is filled with the tablets and also with air in the available open spaces. This forms an air pocket in the interior of the tablet sleeve above the serrations in the rim of the tablet sleeve. The drain valve is secured and the spa system reactivated.

When the filter system and therefore the pump are activated, pressurized water is fed to the inlet 42 and passes along the primary flow path 64. Water passes along the outer flow plenum 64a, through the cylindrical filter element and through the apertures in the standpipe 62. The filtered water then flows down the interior of the standpipe to the outlet 44. (Vent plug 114 is replaced as soon as water begins to flow out its mounting opening.)

A lesser volume of water also passes along the secondary flow path 82 through the chemical dispensing system and serves as a solvent for the chemical dispensing system. The water passing into the regulator valve assembly is pressurized at a pressure substantially equal to that presented to the outside of the filter element; such water is filtered through the prescreen 84 and passes along the regulator inlet 85. The filtered water passes through the regulator valve assembly and down to the interior of the depending sleeve 70 and chlorinator body sleeve 68. The water passes over the top closed end of the tablet sleeve and around the sides of the tablet sleeve interior to the chlorinator sleeve 68. The water passes down the outside of the tablet sleeve to the openings formed by the serrations 100 in the rim of the lower open end of the serrated tablet sleeve. The water initially passes through the apertures in the outlet screen 82 and fills the void above ball 86 in the check valve assembly 78. However, the bias created in the spring 88 and any back pressure in the standpipe 62 keep the ball against the reduced diameter sleeve 90 so that the water does not pass around the ball. As water continues to flow down the sides of the tablet sleeve, the void in the check valve assembly fills up and the water level inside the chlorinator sleeve rises. The water level continues to rise until the filered water contacts the bottom tablet in the tablet sleeve. The water continues to fill the tablet sleeve by compressing the air pocket inside the tablet sleeve. Compression of the air inside the tablet sleeve begins to occur when the water level reaches the top of the serrations 100. Compression of the air pocket continues until the pressure in the air pocket equals the combined force on the ball 86 due to the spring 88 and any back pressure occurring in the standpipe 62. The pressure exerted by the water on the air pocket will increase due to the pressure created at the inlet 42 by the pump. The pressure of the filtered water in the space between the chlorinator sleeve and the tablet sleeve increases and the volume of the air pocket in the tablet sleeve decreases until the check valve assembly opens to allow fluid flow around the ball 86 and into the standpipe 62.

With continued pump operation, equilibrium will be reached in the chemical dispensing system so that the volume of the air pocket inside the tablet sleeve remains relatively constant, and so that the water level inside the tablet sleeve also remains relatively constant so that a given quantity of tablet material is always exposed to dissolution in the water. An example of the water level in the tablet sleeve is shown at 115. Additionally, the flow of filtered water through the serrations in the tablet sleeve remains relatively constant so that a relatively constant flow of chemically treated water passes out of the check valve assembly to the standpipe. In a steady state condition, the dissolution of the tablets and the concentration of chlorine or other halogen ions in the water flowing to the pool or spa is relatively constant. If the pump and filtration system is run continuously, this steady-state condition occurs.

If the filtration system and therefore the pump is turned off, the supply of pressurized water at the inlet 42 is removed. The water pressure in the regulator valve assembly thereforedecreases, and the air pocket expands to force the water out of the tablet sleeve, decreasing the water level of the water around the tablets. The water level will continue to drop and the air pocket continue to expand until such time as equilibrium is reached between the pressure of the air pocket and the pressure of the water in the annulus between the chlorinator sleeve and the tablet sleeve and the water in the check valve assembly 78. When equilibrium is reached, the bias from the spring 88 seats the ball 86 in its seat to close off the valve assembly. Ideally, all water contact with the tablets is removed so that dissolution of the tablets does not continue when the filtration system is off and when there is no water flow through the cartridge. This can be accomplished through various design adjustments such as, for example, by raising the level of the outlet screen while keeping the relative level of the serrations constant. Alternatively, the tablet sleeve may be modified to move the serrations to a point below the outlet screen 82 so that the pressurized water from the regulator assembly must pass down to the serrations and then back up along the interior of the tablet sleeve to make contact with the tablets. Then when the pump is turned off, the air pocket expands to force the water back down to the level of the serrations, which level is below the outlet screen on which the tablets are supported. When the pump is reactivated, the process repeats as described above.

The use of this pressurized filter arrangement for spas increases the efficiency of filtration by approximately one hundred percent. Additionally, this arrangement provides for chlorination of the water immediately after the filtration process within the filter itself and does not require chlorination or other chemical treatment intermittently and by hand.

Figure 3:
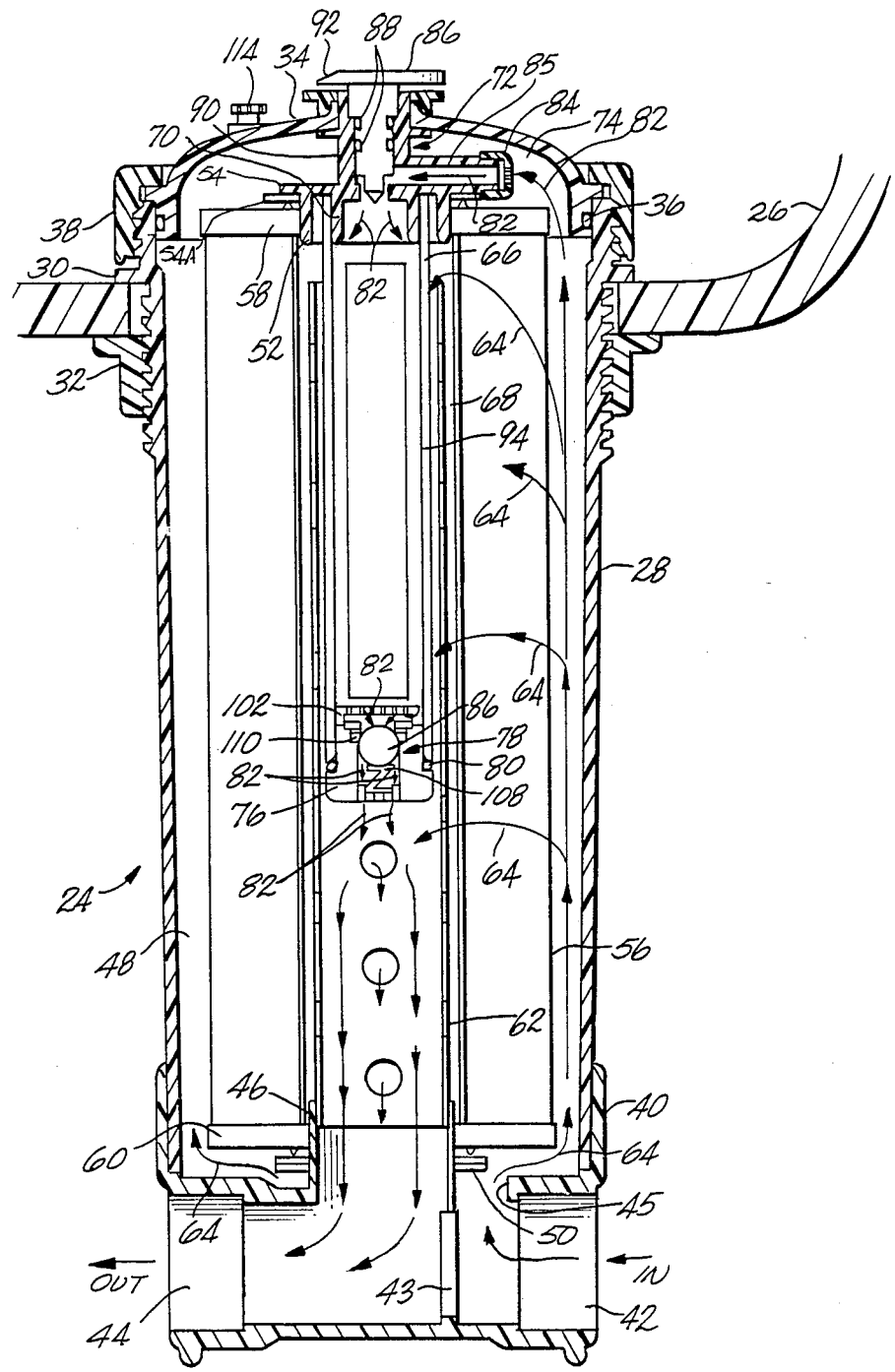
FIG. 3 is a side section of a further embodiment of the filter and chemical dispenser of FIG. 2.

In the embodiment shown in FIG. 3, the chemical dispenser is modified to accommodate a low solubility stick 114 of chemical to be used in treating the water. The apparatus is identical in structure and function to that shown in FIG. 2 except that the serrated tablet sleeve has been removed. In use, no air load or air pocket is formed in the chemical dispenser assembly, and the chemical source chamber is filled with water at all times. The low solubility stick may be bromine tablets or a bromine stick so that full immersion of the chemical source is preferred.

To charge the cartridge, the assembly is drained and cap 78 removed so that a low solubility stick or low solubility tablets can be placed in the chlorinator sleeve 68. The cap is then replaced and the filtration pump is reactivated so that water flows along the primary and secondary flow paths as described above. With respect to the secondary flow path, the water flows through the regulator valve assembly and into the interior of the chlorinator sleeve. Due to the bias of spring 88, the valve assembly 78 remains closed until the pressure rises in the chlorinator sleeve as the water fills the chlorinator sleeve. As the water pressure increases in the chlorinator sleeve, the spring bias of spring 88 is counteracted and water begins to flow around the ball and into the standpipe. During continuous operation, the chemical dissolves at a continuous rate and therefore chemical treatment of the water occurs at a constant rate. Hoewver, if the filtraton system is turned off, for example, during intermittent operation, the chemical remains immersed in the water and the water in the chlorinator sleeve eventually saturates. When the pump is again activated, the pressure builds up in the chlorinator sleeve and the saturated water eventually passes out the valve assembly to the standpipe and out to the pool or spa.

Figure 4:
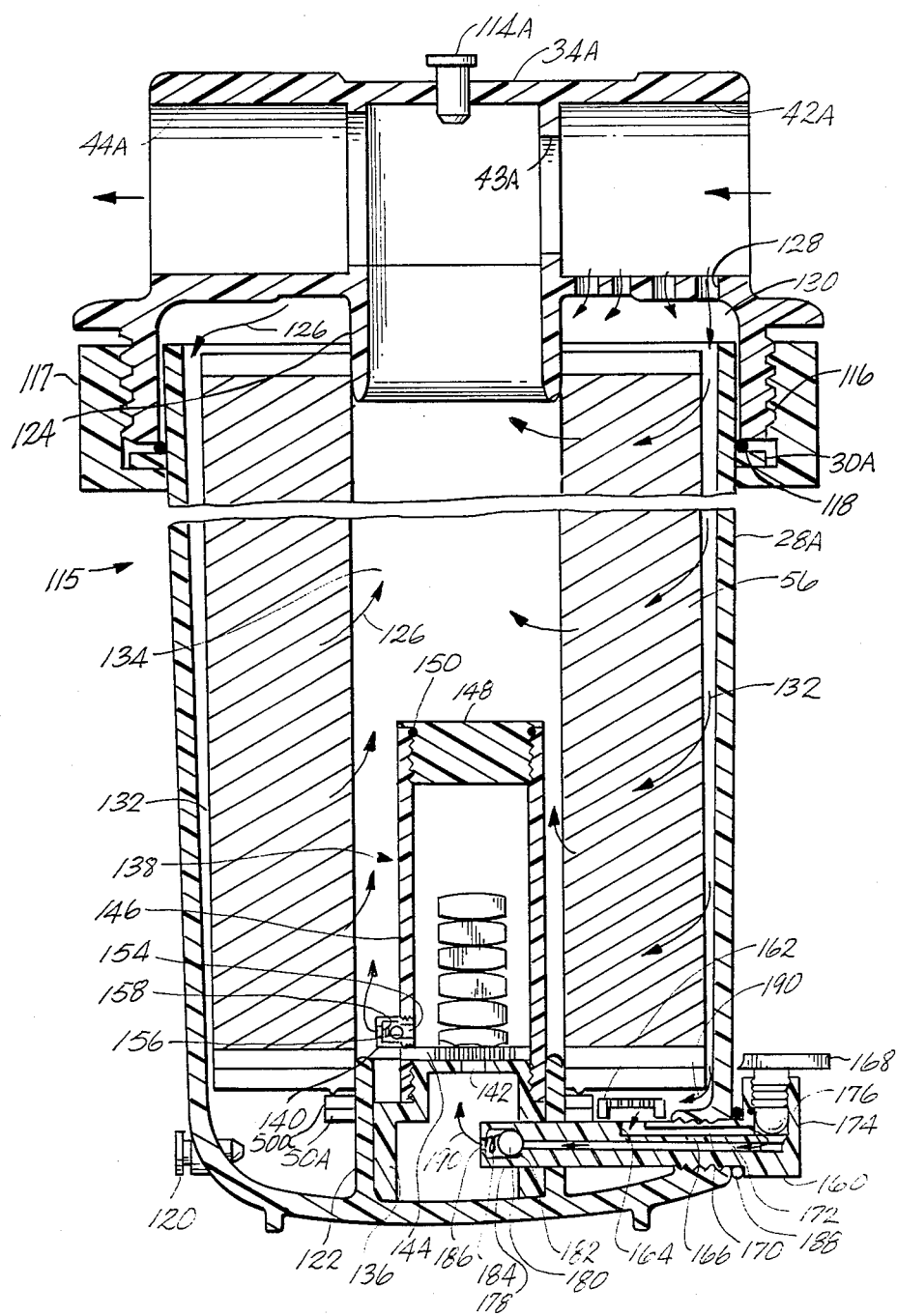
FIG. 4 is a side section of a further embodiment of a filter and chemical dispenser according to the present invention.

FIG. 4 shows a combination filter and chemical dispenser assembly 115 according to a further embodiment of the present invention. The apparatus is similar in some respects to the apparatus shown in FIGS. 2 and 3. The apparatus includes a filter housing tank 28A having a generally hollow cylindrical shape for receiving and supporting a filter element 56. The filter tank and filter element are supported by a cap 34A to which the filter tank is mounted through a lock ring 117 extending over the circular flange 30A and threadably engaging the threads 116 of the cap. An O-ring 118 provides a watertight and airtight seal between the circular flange and cap. The cap in turn is supported by appropriate plumbing in the filter system wherein the pressurized water from the pump is supplied to the inlet 42A and the filtered and chemically treated water is passed from the outlet 44A to the heater or directly to the body of water. The apparatus need not be otherwise supported. Aperture 43A has the same purpose as aperture 43 in assembly 24 shown in FIG. 2.

The cap includes a vent plug 114A in the top thereof and the filter tank includes a drain or vent valve 120 near the bottom of the tank. The filter tank includes a circular cylindrical sleeve 122 for supporting and contacting the filter element. A filter support flange 50A and a corresponding gasket 50a extends circumferentially about the circular cylindrical sleeve 122 for supporting the lower end of the filter element.

The cap includes a depending circular cylindrical sleeve 124 extending downwardly from a central portion of the cap 34A into the hollow interior of filter element 56. The filter element is therefore supported by the filter support flange, the lower cylindrical sleeve 122 and the depending cylindrical sleeve 124.

As with the filtering/dispensing assemblies described with respect to FIGS. 2 and 3, the pressurized water from inlet 42A follows a primary flow path indicated by the arrows 126. However, rather than flowing upward from the base of the filter tank, the pressurized water flows downward from the inlet 42A through the plurality of apertures 128 into the upper plenum 130 and then to an outer flow plenum 132 around the outer circumferential surface of the filter element. The pressurized water then flows substantially radially through the pleated filter element to the interior space 134 of the filter element. The filtered water then flows up inside the circular cylindrical sleeve 124 and out the outlet 44A.

A source chamber support 136 sits inside the lower circular cylindrical sleeve 122 for supporting a chemical source chamber 138, described more fully below. The chemical source chamber 138 may be centered on the chamber support 136 or may be offset with respect to the sleeve 122, as shown in FIG. 4 to accommodate an outlet check valve 140 mounted in the lower portion of the chemical source chamber 138. The source chamber support includes a first aperture of 142 defining a flow port for allowing liquid from the inlet to pass to the inside of the chemical source chamber 138.

The chemical source chamber 138 is threadably mounted to the source chamber support 136 so that the chemical source chamber covers the first aperture 142. Preferably, threads on the lower end of the source chamber engage threads on the chamber support. However, threaded engagement is not necessary. An inlet screen 144 extends across the interior of the source chamber and over the first aperture for screening the pressurized water passing from the first aperture into the source chamber 138. The portion of the source chamber above the inlet screen is defined by a generally hollow cylindrical tablet sleeve 146 which forms a body of the chlorinator and which extends above the inlet screen in the interior space of the filter element. The top of the tablet sleeve is closed off with a plug 148 and is airtight and watertight through an O-ring 150. The interior of the source chamber constitutes means for forming a compressible gas pocket. High solubility tablets 152 having the same character and serving the same function as described with respect to the tablets of FIG. 2 are placed inside the tablet sleeve.

The chemical source chamber further includes an outlet check valve threaded into a lower portion of the tablet sleeve very closely above the inlet screen 144 for allowing passage of fluid only from the source chamber to the interior space of the filter element. The outlet check valve includes an inlet aperture 154. A ball 156 seats in the inlet aperture 154. The ball is biased with a spring 158 toward aperture 154.

A regulator valve assembly 160, for regulating dispensing of chemical to the pool or spa, extends in the lower portion of the filter tank 28A through the wall of the filter tank, the cylindrical sleeve 122 and the source chamber support 136 to the interior cavity of the chamber support. A prescreen 162, for coarse-filtering the pressurized water before it enters the regulator valve assembly, is positioned and may be skirted, over an input 164 to the regulator valve assembly. The regulator valve assembly further includes a septum baffle 166 forcing the water to flow radially outward with respect to the filter tank to a manually adjustable control needle valve 168. The water passes through a flow channel 170 to the needle valve 168 and then to a second flow channel 172 to flow radially inward to the interior of the source chamber support 136. The needle valve 168 regulates the flow of filtered water from the flow channel 170 to the second flow channel 172. The needle valve is rotatably engaged through threads with a valve housing 174. The needle valve is made watertight and airtight with an O-ring 176 between the needle valve and the housing. The needle valve can be rotated to close off the passage between the first and second flow channels 170 and 172 respectively.

The second flow channel 172 then passes the filtered water from the needle valve to a regulator check valve 178 comprising a ball 180 biased toward a seat 182 by a spring 184. The regulator check valve allows passage of water only from the regulator valve assembly to the interior of the source chamber support 136 through a regulator outlet 186. The regulator valve assembly 160 is made airtight and watertight with respect to the filter tank through an O-ring 188.

The prescreen 162, the regulator valve assembly 160, the source chamber support 136 and the chemical source chamber 138 constitute a secondary flow path as indicated by the arrows 190. For chemical treatment of the pressurized water passed to the inlet 42A, the water passes along the secondary flow path 190. The secondary flow path is in parallel with the primary flow path around the filter element.

For purposes of discussion of the operation of the apparatus shown in FIG. 4, it will be assumed that the filtering and chemical dispensing apparatus has been operational. In order to replenish the supply of source tablets, the filtration system is turned off and the filter tank drained by opening the drain valve 120 and the vent plug 114A. After draining, the filter tank 28A is removed by loosening and disengaging the lock ring 117 from the threads 116. The filter tank drops away from the cap 34A. The filter element can then be removed and the plug 148 in the chemical source chamber 138 can be unfastened. The source chamber and the regulator valve assembly may be inspected as necessary. A full supply of tablets can then be placed in the source chamber 138 and the plug 148 replaced on the top of the source chamber. The filter, which can have been cleaned as needed, is placed around the chemical source chamber and supported on the filter support flange 50A. The filter tank is placed in the bottom of the cap 34A and the lock ring rethreaded on threads 116 to fasten the filter tank to the cap.

When the filtration system is reactivated, the pump provides pressurized water to the inlet 42A. Unfiltered water passes along the primary flow path through the filter element. Water also passes along the secondary flow path 190 through the prescreen 162 and through the regulator valve assembly 160. If the control needle valve 168 is turned all the way down to be seated in the valve housing, no water will pass to the second flow channel 172. However, if the needle valve is raised from its seat, pressurized water will pass into the second flow channel to the regulator check valve 178. During proper operation, the pressurized water will have a pressure sufficient to move the ball of the regulator check valve 178 so that the pressurized water passes into the source chamber support 136. The pressurized water eventually fills the cavity so that the water passes through the aperture 142, the inlet screen 144 and into the interior of the chemical source chamber 138. Simultaneously, filtered water will have filled the interior of the filter element to flow out the outlet 44A. The head created in the interior of the filter element, augmented by the bias of spring 158, biases the ball 156 of the outlet check valve 140 to be seated in its seat. As a result, the influx of water from the cavity of the source chamber support 136 compresses the air pocket in the interior of the the tablet sleeve until such time as the pressure developed in the interior of the tablet sleeve corresponds to the combined force of the spring 158 and of the water pressure in the interior space of the filter element on the ball 156. As the air pocket compresses, more of the lower tablets are exposed to the pressurized water and begin to dissolve halogen ions into the water. As the pressure continues to increase, the solution forces the ball 156 against the biasing forces and passes out the outlet check valve 140 into the interior of the filter element.

During steady state flow, the pressurized water from the inlet is filtered through the filter element 56 and dissolves halogen ions in the chemical source chamber 138 for chemically treating the water for the pool or spa. This process continues until the pump is deactivated for shutting down the filtration system. As the pressure at the inlet 42A decreases, the pressure of the water passing through the regulator valve assembly decreases. Eventually, the regulator check valve 178 will close preventing passage of water, which may contain halogen ions, into the regulator valve assembly. Additionally, the air pocket will expand by pushing fluid out the outlet check valve 140 until the check valve seats. The expansion of the trapped air bubble in the chlorinator forces the level of the water inside the chemical source chamber to fall so that the halogen ion source material in the chlorinator is substantially dry during periods when the pool or spa circulation pump is not operating.

Figure 5:
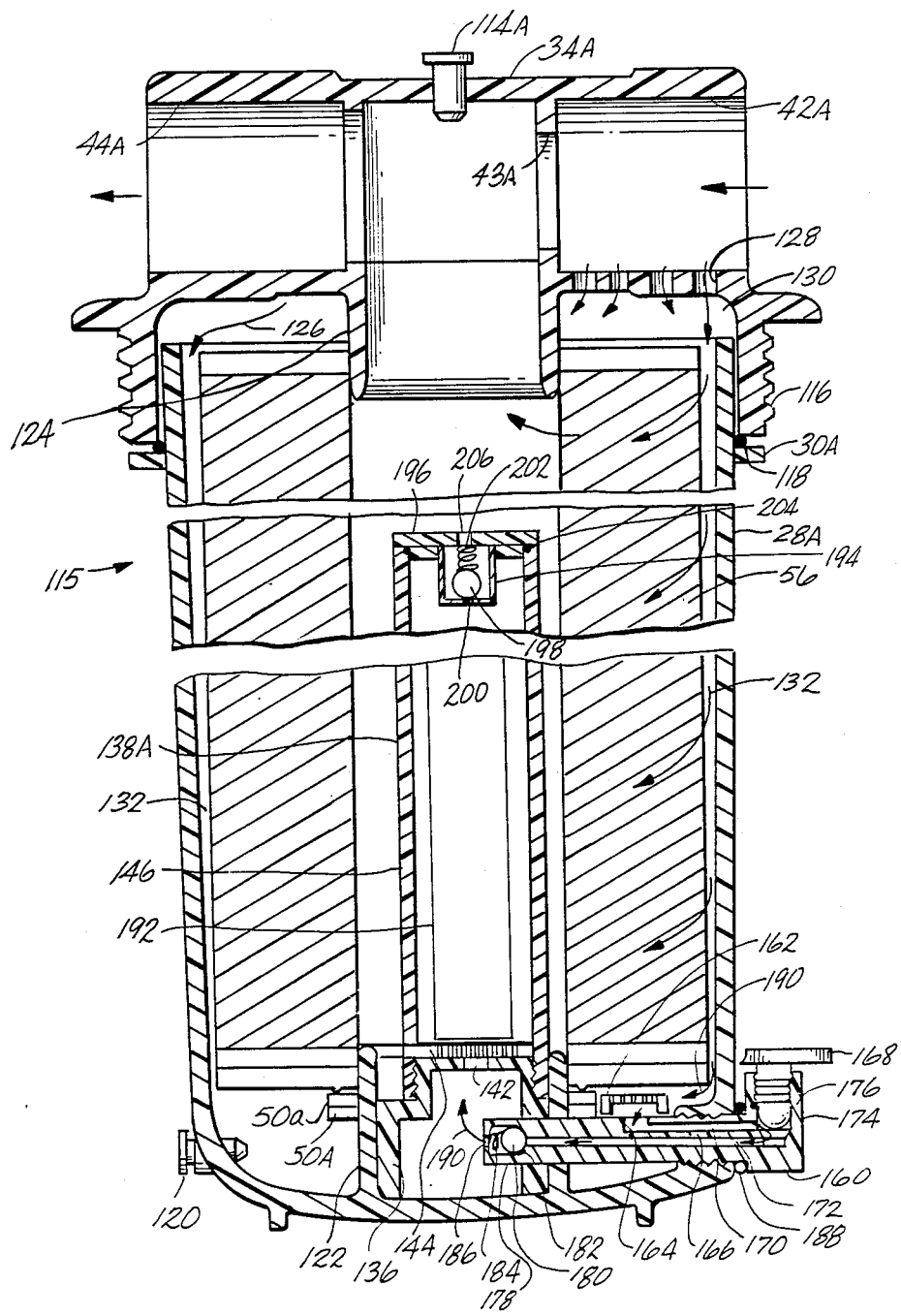
FIG. 5 is a side section of a further embodiment of the filter and chemical dispenser of FIG. 4.

In the embodiment of the filtration and chemical dispenser assembly of FIG. 5, the chemical source chamber 138 of FIG. 4 is replaced by a chemical source chamber 138A for use with low solubility sticks 192 of halogen ion source material. The chemical source chamber 138A includes an inlet screen 144 disposed over an aperture 142 in the source chamber support 136. The chemical source chamber may be open at the top, or it may be covered by a simple screen, or it may include a check valve assembly 194 formed in the cap 196 for allowing passage of fluid only out of the chemical source chamber 138A. The check valve assembly includes a ball 198 biased to an aperture 200 by a spring 202. The cap forms a watertight and airtight seal through an O-ring 204. Chemically treated water passes out of the chemical source chamber 138A through the aperture 206 into the interior space of the filter element 56. The structure and function of the assembly shown in FIG. 5 is otherwise the same as the identical elements shown in FIG. 4. Additionally, the function of the apparatus with respect to the low solubility halogen source material is substantially the same as discussed with respect to the embodiment shown in FIG. 3.

The filtration pump serves to force water through the filter element and to provide continuous flow of solvent water to the chemical source material for treating the pool or spa water. The solvent water is taken from the upstream side of the filter cartridge so that the chemical dispenser can take advantage of the higher pressure on the upstream side of the filter.

Each of the regulator valve assemblies in FIGS. 2-5 serve to limit the flow volume of fluid through the chemical dispenser and to control the pressure of the water entering the chemical source chamber. The pressure of the water affects the amount by which the air pocket is compressed.

The chemical dispensers described above are placed inside the cartridge filter assemblies without substantial modification of the filtration assemblies. Therefore, both filtration and chlorination are achieved within the envelope of the filter housing which can be made to have the same external dimensions as existing arrangements which provide only filtration. Additionally, the chemical dispenser assembly are easily accessible and are relatively simple to recharge and to maintain.

In the embodiments shown in FIGS. 2 and 4, it is contemplated that the flow rate of solvent water will be relatively low since the tablets used in these embodiments have a relatively high solubility. In the embodiments shown in FIGS. 3 and 5, it is contemplated that the flow rate may be higher since the concentration of halogen ions going into solution is not affected to as great an extent by the flow rate of solvent.

In the embodiments shown in FIGS. 4 and 5, the control needle valve 168 may be a needle valve oriented radially along a horizontal axis with respect to the filter tank 28A.

It should be noted that the above are preferred configurations, but others are foreseeable. The described embodiments of the invention are only illustrative of the inventive concepts and are not an exhaustive catalog of all forms in which the present invention can be embodied. The scope of the invention is not to be restricted to the described embodiments. Various and numerous other arrangements may be devised by persons skilled in the art without departing from the spirit and scope of the invention. For example, other arrangements may be provided for the prescreen 162 over the regulator valve assembly 160 of FIGS. 4 and 5. Additionally, the inlet screen 144 of the chemical source chamber 138 may be loosely disposed inside the chemical source chamber 138. The chemical source chambers 138 and 138A may be interchangeable so that different kinds of halogen ion source material may be used with the same filtration apparatus.

What is claimed is:

1. A filter and chlorinator assembly for use with swimming pools, spas and the like having a water circulation system including a pump, the assembly comprising
    (a) a filter housing defining an elongate filter chamber,
    (b) an elongate axially hollow radial-flow filter element in the housing,
    (c) water flow inlet and outlet openings to and from the housing at an end of the housing,
    (d) flow directing means associated with the inlet and outlet openings for directing at least a portion of the flow of water entering the inlet opening to the outer portions of the filter chamber for flow radially inwardly of the filter to a central space in the housing and to the outlet opening for flow from the housing,
    (e) a chlorinator assembly within the central space of the filter element comprising
        (1) a tubular body defining therein a cavity into which can be placed a quantity of a solid, water-soluble source of chlorine ions,
        (2) a flow port between the cavity to the central space at a lower end of the body,
        (3) other flow means between the interior of the cavity and the exterior of the body,
        (4) flow regulating means associated with the outer portions of the filter chamber and with one of the flow port and the other flow means so arranged that upon flow of water to the housing inlet opening, a regulated water flow occurs through the cavity and from the cavity to the space and thence to the outlet opening concurrently with the flow of water radially through the filter to the space, and
        (5) a check valve associated with one of the flow port and the other flow means for preventing reverse flow therethrough.

2. Apparatus according to claim 1 wherein the flow regulating means is associated with the upper end of the body in cooperation with the other flow means which comprises a flow inlet to the cavity.

3. Apparatus according to claim 2 wherein the check valve is associated with the flow port for preventing water flow from the space to the cavity therethrough.

4. Apparatus according to claim 3 including a hollow sleeve having a closed end and an open end disposable in the body with its open end adjacent the flow port and in which the solid soluble source of chlorine ions is disposable, the sleeve defining water flow openings thereinto at its open end, the sleeve enclosing with the ion source a trapped volume of air which is compressed during operation of the filter and chlorinator assembly by the pressure of water flowing into the sleeve through the flow openings and which expands to occupy substantially the available volume of the sleeve in the absence of applied water pressure at the flow openings, whereby the ion source is substantially dry during periods when the filter and chlorinator assembly is not in operation.

5. Apparatus according to claim 3 wherein the body is carried by a housing cap which is removably and sealably coupled to the housing at an upper end thereof, removal of the cap enabling removal of the filter element from the housing and loading of the cavity with solid ion source material.

6. Apparatus according to claim 5 wherein the check valve is defined in a closure member which is removably and sealably couplable to the body lower end.

7. Apparatus according to claim 6 including means defined by and cooperating with the exterior of the housing proximately below the cap for mounting the housing in an opening of a support member.

8. Apparatus according to claim 1 wherein the inlet and outlet openings to the housing are located at a lower end of the housing.

9. Apparatus according to claim 1 wherein the chlorinator assembly is located substantially wholly within the central space of the filter element.

10. Apparatus according to claim 1 wherein the flow regulating means is associated with the lower end of the body in cooperation with the flow port for receiving water from an outer portion of the chamber and for discharging water therefrom toward the port means which comprises a flow inlet to the cavity through the bottom thereof.

11. Apparatus according to claim 10 wherein the check valve is associated with the flow regulating means proximately adjacent to and upstream of the flow port for preventing water flow through the flow regulating means to the chamber.

12. Apparatus according to claim 11 wherein the other flow means is defined laterally through the body proximate to the lower end of the cavity, and including a cavity closure member removably and sealably couplable with an upper end of the body for enclosing with the ion source a trapped volume of air which is compressed during operation of the filter and chlorinator assembly by the pressure of water flowing to the flow port and which expands to occupy substantially the available volume of the cavity in the absence of applied water pressure at the flow port, whereby the ion source is substantially dry during periods when the filter and chlorinator assembly is not in operation.

13. Apparatus according to claim 12 including a further check valve associated with the other flow means for preventing water flow from the space into the cavity.

14. Apparatus according to claim 10 wherein the other flow means is defined at the upper end of the cavity through a body closure member which is removably couplable to the body.

15. Apparatus according to claim 14 including a further check valve associated with the other flow means for preventing water flow from the space to the cavity.

16. Apparatus according to claim 10 wherein the inlet and outlet openings are located at the upper end of the housing.

17. An integrated liquid filter and chemical dispenser comprising:
    a filter housing having a liquid inlet thereto and a liquid outlet;
    a cylindrical, axially hollow, radial flow filter assembly in the housing;

flow directing means for defining a liquid flow path in the housing from the inlet to the outlet, the flow path comprising first and second flow passages arranged in parallel flow relation, the first passage being radially through the filter and the second passage being into the filter interior other than through the filter; and a chemical dispenser disposed along the second passage essentially wholly within the axial extent of the interior of the filter and having liquid ingress and egress means to and from a chamber therein in which a chemical to be dispensed can be placed for addition to a liquid flowing into and out of the chamber.

18. Apparatus according to claim 17 wherein the second passage begins in the housing downstream of the inlet.

19. Apparatus according to claim 17 including a valve in the path for regulating the proportion of flow between the passages.

20. Apparatus according to claim 19 wherein the valve is operable from outside the housing.

21. Apparatus according to claim 17 including check valve means in the path for preventing reverse liquid flow to the dispenser chamber.

22. Apparatus according to claim 17 wherein the inlet and the outlet are at one end of the housing, and the ingress means to the dispenser chamber are at substantially an opposite end of the housing.

23. Apparatus according to claim 22 including a housing closure member releasably engageable with the housing at said opposite end, and wherein the dispenser is carried by the closure member to be disposed in the interior of the filter upon closure engagement of the closure member with the housing.

24. Apparatus according to claim 17 wherein the dispenser chamber is elongate in a substantially vertical direction, the ingress and egress means are located at opposite ends of the chamber, and including means selectively cooperable with the chamber therein for causing the chamber to contain a captive air volume which is compressible from an initial size thereof in response to increases in liquid pressure applied thereto.

25. A water filter assembly for use with spas and the like having a molded deck defining a well therein, the assembly comprising:

a cylindrical housing having an open upper end and inlet and outlet water flow openings at its lower end in association with means for directing at least a portion of water entering the inlet opening to the outer portions of a filter chamber within the housing and for routing water from a central part of the filter chamber to the outlet opening;

means in the chamber for supporting in a selected position an elongate, axially hollow filter cartirdge for flow of water therethrough from the outer portions of the filter chamber to the central part thereof;

means defined by and cooperable with an outer portion of the housing proximate its upper end for mounting the housing in an opening in a spa deck well;

a housing closure member removably and sealably coupleable to the upper end of the housing;

the housing, filter cartridge and closure member being cooperatively defined for flow of some water from the outer portions of the filter chamber to a cavity defined in a chlorinator assembly carried by the closure member to be disposed in the axial hollow of the cartridge upon coupling of the closure member to the housing and including water flow means for directing water to the cartridge axial hollow via a chlorination chamber in the chlorination assembly in which a quantity of soluble chlorination ion source material can be placed.

26. Apparatus according to claim 25 wherein the water flow means includes a flow path, and a flow regulating valve operable from the exterior of the closure member for adjusting the state of the valve.

27. Apparatus according to claim 25 wherein the chlorinator assembly is arranged for enclosing a trapped bubble of air in the chlorination chamber upon placement of ion source material in the chamber and coupling of the closure member to the housing, and wherein the chlorination flow path enters and leaves the chlorination chamber at locations proximate each other at a lower extremity of the chlorination chamber.

* * * * *